United States Patent [19]

Hiruma et al.

[11] 4,276,621

[45] Jun. 30, 1981

[54] OBJECT CONFIRMING APPARATUS

[75] Inventors: Hideo Hiruma; Yukio Maruhashi, both of Hamamatsu, Japan

[73] Assignee: Koa Denshi Kogyo Kabushiki Kaisha, Hamamatsu, Japan

[21] Appl. No.: 9,495

[22] Filed: Feb. 5, 1979

[30] Foreign Application Priority Data

Dec. 22, 1978 [JP] Japan ........................................ 54-83

[51] Int. Cl.$^{3}$ ................................................ G01S 15/02

[52] U.S. Cl. ........................................................ 367/97

[58] Field of Search ............................ 367/97, 100, 99

[56] References Cited

U.S. PATENT DOCUMENTS

| | | | |
|---|---|---|---|
| 3,271,730 | 9/1966 | Stedtnitz | 367/97 |
| 3,854,115 | 12/1974 | Barthelemy | 367/97 |

*Primary Examiner*—Richard A. Farley

*Attorney, Agent, or Firm*—Spencer & Kaye

[57] ABSTRACT

An object confirming apparatus receives ultrasonic wave pulses periodically transmitted from a transmitter and confirms them a plural number of times according to the periodicity of the transmitted pulses so that a confirming signal may be generated which is free from the influence of noise.

5 Claims, 15 Drawing Figures

OBJECT CONFIRMING APPARATUS

BACKGROUND OF THE INVENTION

The present invention relates to an object confirming apparatus which can detect the presence or location of an object by trasmitting pulses of ultrasonic waves periodically and detecting the reflected back waves of the pulses from the object in order to confirm the presence or location thereof or if necessary to obtain the distance from the object.

Sonars or ultrasonic radars have widely been used for detecting the presence or location of an object or obtaining the distance from the object, and in these apparatuses consideration has been given to removing objectionable noise.

Hereinafter the examples and principles of such conventional apparatuses will be briefly explained using FIGS. 1 and 2, FIG. 1 being a block diagram showing such a conventional apparatus and FIG. 2 being a waveform diagram for explaining the operation of the apparatus of FIG. 1. The time interval, or period, at which the ultrasonic waves are transmitted is determined by a time base generator 1. In FIG. 2(*a*), a pulse train for a basic period Ts is shown. By this pulse train, a transmitter pulse generator 2 is actuated which determines the pulse width, and during this pulse width an ultrasonic frequency oscillator 3 is operated. The output of the oscillator 3 is power amplified by a power amplifier 4, and the output of the amplifier drives a transmitting transducer 5 for transmitting ultrasonic waves.

The ultrasonic waves are thus transmitted by the transducer 5 into space and reflected from an object after they hit against the object. These reflected ultrasonic waves are received by a receiving transducer 6. The output from the transducer 6 is amplified by an amplifier 7 which is tuned to the frequency of the ultrasonic waves transmitted. The tuned amplifier 7 is used for removing noise components at other frequencies. The output of the amplifier 7 is converted into pulses through a receiving pulse generator 8, which limits ouptut signals exceeding a predetermined level to that of the level so as to remove noise components of a lower level. The time interval $t_{R1}$ (see FIG. 2) from the generation of the output pulses from the time base generator 1 until the output from the pulse generator 8 is outputted is in proportion to the distance from the object, and therefore the distance may be indicated by an indicator 10, taking the interval $t_{R1}$ as the integrating time of an integrating circuit 9.

Thus care has been taken to remove noise in these apparatuses as shown above. On the other hand, the present invention is directed to locating and selecting a correct signal, more than to the removal of noise. Particular attention was paid to the periodicity of the signal components for the purpose of confirmation. As is shown in FIG. 2, assuming that the object is static with respect to the fixed transducers 5 and 6 (see FIG. 1), the time interval $t_{R1}$ from the time of trasmission of the first wave ($t_o$) and receipt of the reflected wave is the same as $t_{R2}$ for the second transmission $t_1$. The receiving period $T_R$ is equal to $T_s$.

In Japanese laid open patent application No. 11535/1977, titled "Monitor for the Rear of Automobile", there is shown a circuit utilizing the periodicity. In this circuit, after detecting one reflected wave, masking is effected for a time shorter than the whole period to remove noise and to obtain the correct next reflected wave. This is advantageous with respect to the removal of noise.

SUMMARY OF THE INVENTION

The principle of this invention is to utilize this periodicity for detecting a correct signal.

Generally, the following equation (1) is satisfied between the transmitting period $T_s$ and the receiving period $T_R$:

$$T_R = \frac{S_V}{S_V \pm O_V} \cdot T_s \qquad (1)$$

where:

$S_V$ is the velocity of sound $O_V$ is the relative velocity between the apparatus and the object (a positive value shows that the relative distance is decreasing; and a negative value means the reverse case).

As an example, assuming that the largest value of $O_V$ is 10 m/sec. when $S_V$=340 m/sec. and $T_S$=50 ms, $T_R$ would be between 48.6 ms and 51.5 ms. When the shorter period is made $t_s$ and the longer period is made $t_l$, the time period between $t_s$ and $t_l$ is made equal to an expected time. As shown in FIG. 4 which gives the waveforms of $t_s$ and $t_l$, when the second signal is received between the time interval of the expected time ($t_l - t_s$) after the first signal is received, the probability is very high that the two signals are both correct. On the other hand, if the second signal does not appear, it is probable that the first signal is incorrect. The more such confirmation is repeated, the more precise the confirmation becomes.

Therefore it is an object of this invention to provide an object confirming apparatus which can ascertain the correctness of the reflected ultrasonic wave pulses transmitted with a predetermined time interval by the aid of the transmitting period, and which can pick up the signal.

In order to fulfil the above purpose, the object confirming apparatus according to the present invention comprises an ultrasonic wave transmitter for transmitting ultrasonic waves at a predetermined time interval; a receiver for receiving waves reflected by an object the ultrasonic waves transmitted by the ultrasonic wave transmitter have impinged thereon; a shaping circuit for shaping the output of the receiver into pulses of a predetermined width; an expected period setting circuit which receives an output from the shaping circuit and which sets an input expected period of a next pulse when it receives a first input pulse, and sets another expected period when it receives the next pulse within the input expected period or deems a further pulse as the first pulse when it does no receive any input within the input expected period; a gate circuit whose signal input terminal is connected with the shaping circuit and whose gate control input terminal is connected with the output of the expected period setting circuit; and an output circuit which outputs an object confirming signal when more than one pulse is outputted from the gate circuit.

With this construction, the apparatus of this invention can fulfil the above-mentioned object.

BRIEF DESCRIPTION OF THE DRAWINGS

The above and other objects, features and advantages will be more apparent upon a study of the appended drawings, in which.

DESCRIPTION OF THE PREFERRED EMBODIMENTS

Figure 1:
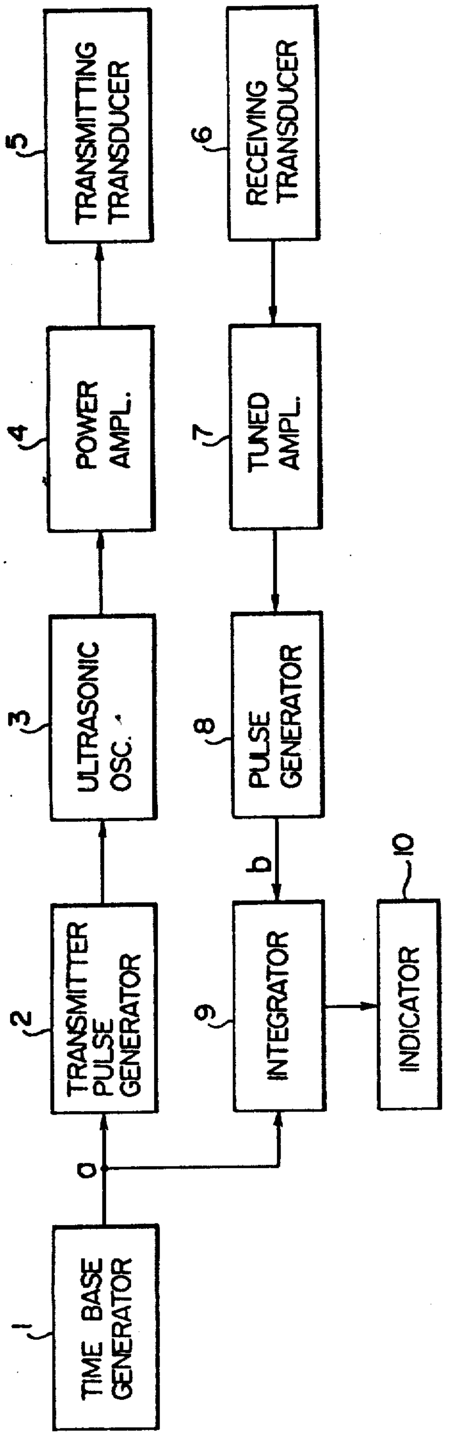
FIG. 1 is a block diagram showing the structure of the conventional object confirming apparatus.
Figure 2:
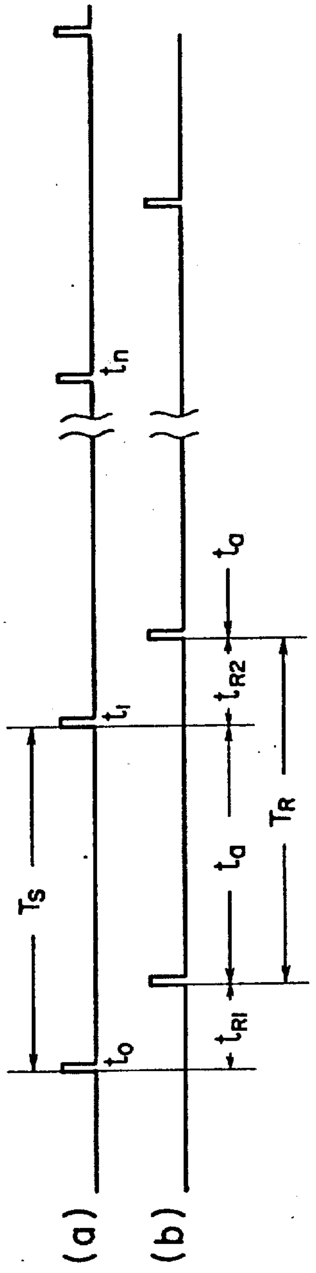
FIG. 2 is a waveform diagram for explaining the operation of the conventional apparatus shown in FIG. 1.
Figure 3:
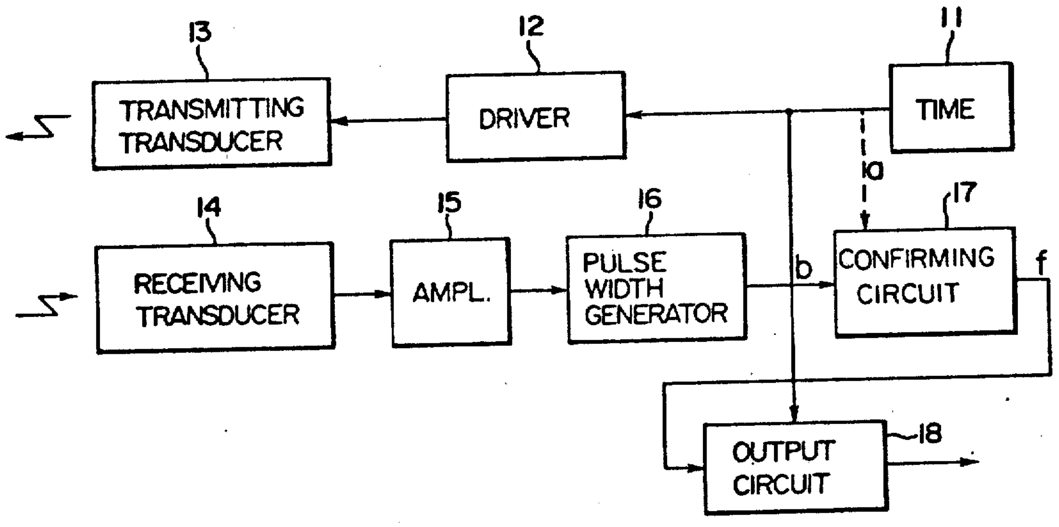
FIG. 3 is a block diagram showing the basic structure of the object confirming apparatus according to the present invention.

In FIG. 3, the structure of a time base generator 11, a transmitting transducer 13, a transducer driving circuit 12, etc. is the same as in the conventional circuit of FIG. 1. The received signal which is received by a receiving transducer 14 and processed by an amplifier 15 is shaped by a received signal shaping circuit 16 into pulses of a predetermined amplitude and of a predetermined relatively narrow width and outputted therefrom. These shaped pulses are confirmed as to correctness by a confirming circuit 17. If the pulse output is confirmed to be correct, it is converted by an output regulating circuit 18 into a proper output signal.

Figure 5:
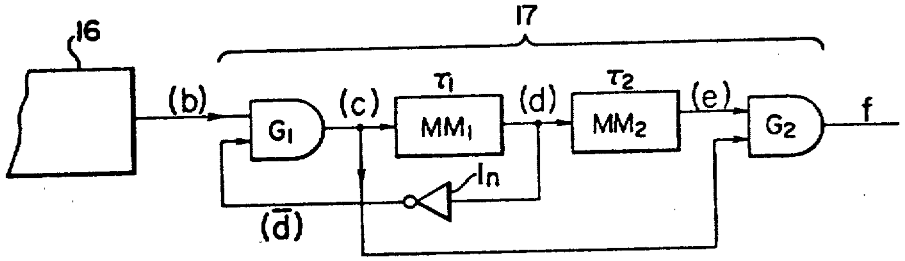
FIG. 5 is a diagram showing an embodiment of the object confirming circuit used in the apparatus of this invention.

FIG. 5 is a circuit diagram showing an embodiment of the basic unit forming the confirming circuit. The circuit of this embodiment is formed with a first AND gate $G_1$, a second AND gate $G_2$ and first and second monostable multivibrators $MM_1$, and $MM_2$. The output from the received signal shaping circuit 16 is connected with one of the input terminals of the gate $G_1$, and the other input terminal thereof is connected to output of $MM_1$, to be mentioned later, through an inverter In. The output terminal of the gate $G_1$ is connected with both the input terminal of $MM_1$ and the lower input terminals of the gate $G_2$. The output of $MM_1$ is connected with the input terminal of $MM_2$, and the output terminal of $MM_2$ is connected with the upper, or control input terminal of gate $G_2$. $MM_1$ and $MM_2$ are the monostable multivibrators which are triggered with the negative edge of the input signal thereto. The delay time $\tau_1$ of $MM_1$ and $\tau_2$ of $MM_2$ are determined by t1 and ts which determine as already mentioned the expected period, and also by the output pulse width $\delta$ of the shaping circuit 16. $\tau_1$ and $\tau_2$ are given by the following equations, respectively:

$$\tau_1 = ts - \delta$$

$$\tau_2 = t1 - ts + \delta.$$

Figure 4:
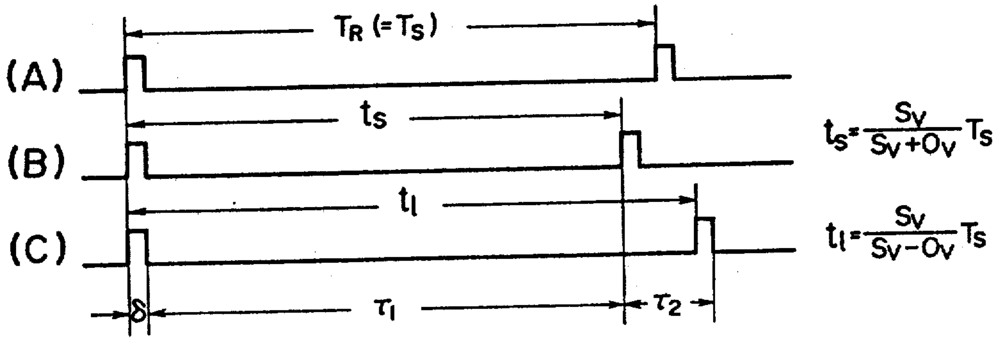
FIG. 4 is a graph for explaining an area wherein the reflected waves are present.

In FIG. 4, the relation of $\tau_1$, $\tau_2$, ts, t1 and $\delta$ is shown.

Figure 6:
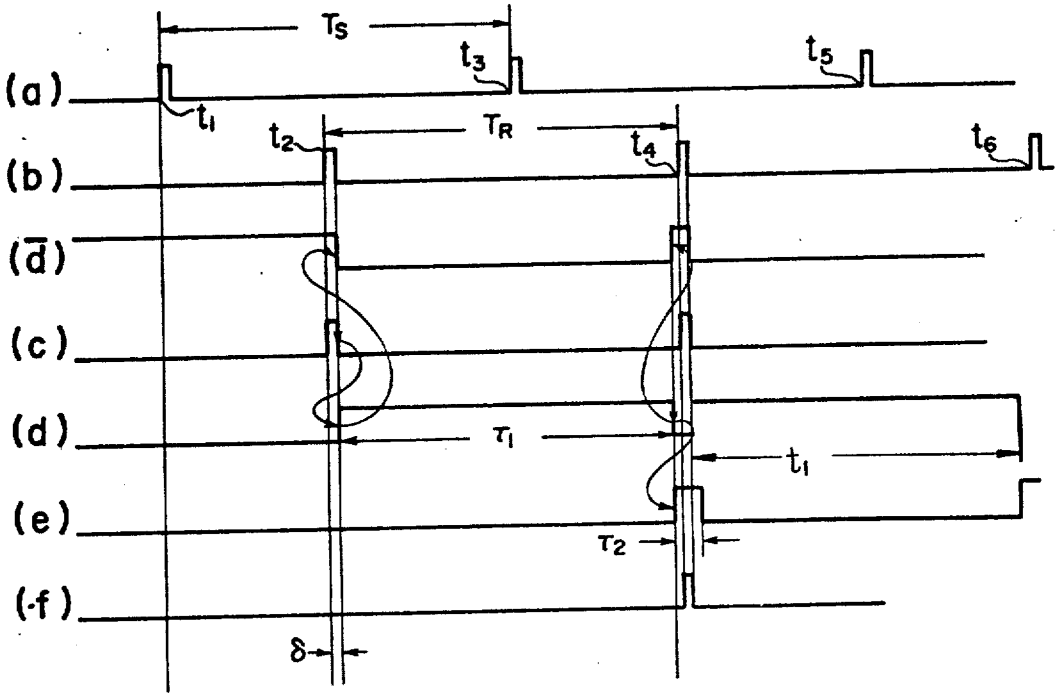
FIG. 6 is a waveform diagram for explaining the operation of the circuit shown in FIG. 5.

In FIG. 6, if the output of the shaping circuit 16 caused by an ultrasonic wave transmitted at the time $t_1$ of (a) is generated at the time $t_2$ of (b), this output $t_2$ appears at point (c) when $(\bar{d})$ applied to the input terminal of $G_1$ is of a high level. $MM_1$ is triggered by the negative edge of the pulse appearing at point (c) (FIG. 5) and outputs an output of a high level at (d) (FIG. 5) for the period $\tau_1$. When the output of $MM_1$ switches to the high level, the output of the inverter In is driven to the low level closing gate $G_1$. Therefore, if an output is generated from the circuit 16 for the period $\tau_1$ shown in FIG. 6, it can not pass the gate $G_1$. If the output (d) of $Mm_1$ becomes low after the period $\tau_1$, the output $\bar{d}$ of the inverter In becomes high to open the gate $G_1$. At the same time, $MM_2$ is triggered by the fall of $MM_1$ to generate an output of a high level as shown at (e). At the time $t_4$ before the end of the period $\tau_2$ of $MM_2$, the output pulse of the shaping circuit 16 is caused by the ultrasonic wave transmitted at the time $t_3$ and it passes the gate $G_1$ and then $G_2$ to output an output (f). By the fall of the pulse passing the gate $G_1$, $MM_1$ is again set as already mentioned.

As above, pulses appearing as outputs of the shaping circuit 16, which satisfy the relation of $ts < tR < t1$, are subsequently outputted from the gate $G_2$. This means that the pulse at the time $t_4$ is outputted from the gate $G_2$ after being confirmed by the pulse appearing at the time $t_2$. On the other hand, if a pulse is generated at the time $t_4$, it may be confirmed that the pulse at the time $t_2$ is a correct one and not noise. Of course the pulse of $t_2$ is not outputted except when it is already confirmed by its own preceding pulse.

Figure 7:
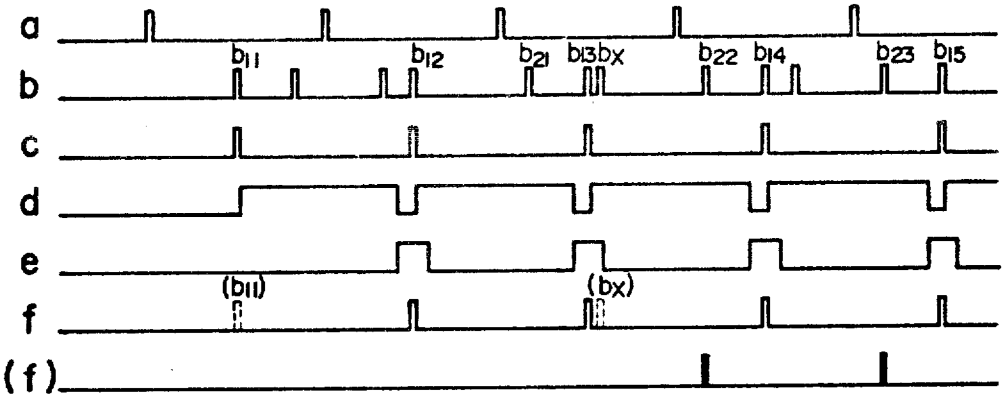
FIG. 7 is an operational waveform diagram more practical for the purpose of explaining the operation of the circuit of FIG. 5.

FIG. 7 is a more practical operation waveform diagram, in which a, b, c, d, e and f are the same as those already explained with reference to FIG. 6. In b of FIG. 7, $b_{11}$, $b_{12}$, $b_{13}$, $b_{14}$ and $b_{15}$ are signal pulses appearing periodically as explained above, and they appear as outputs at f, except for the pulse corresponding to $b_{11}$. From study of graph b, it is known that $b_{21}$, $b_{22}$ and $b_{23}$ have the predetermined periodicity. In the circuit of this embodiment, $b_{21}$, $b_{22}$ and $b_{23}$ do not appear in f in order to set $MM_1$ caused by the first pulse. In (f), are shown the pulse outputs of the $b_{21}$ group which should have appeared in the absence of the pulse train of the $b_{11}$ group. In the very proximity of $b_{13}$ a pulse $b_x$ is generated, which however is removed completely since $MM_1$ is set by the fall of $b_{13}$.

In the above embodiment, the output of $MM_1$ is returned to the input terminal of the gate $G_1$ through the output inverter In, but if $MM_1$ is a multivibrator which can not be retriggered, such a multivibrator being known as a non-retriggerable multivibrator, the expected period setting circuit may be formed without using $G_1$ and In.

If a retriggerable multivibrator is used in a circuit which omits gate $G_1$ and inverter $I_N$, a signal input having a period $T_1$ (FIG. 6) would retrigger the multivibrator and the quasistable state would continue for a period greater than $T_1$. Since this might prevent setting the correct time period, the gate $G_1$ is closed for the period $T_1$. On the other hand, if a non-retriggerable multivibrator is used, there is no need to inhibit the input to the multivibrator for the period $T_1$. Rather, the input terminal of the multivibrator may be connected directly to the output terminal of the shaping circuit 16. Thus, with this arrangement, the inverter may also be omitted.

Figure 8:
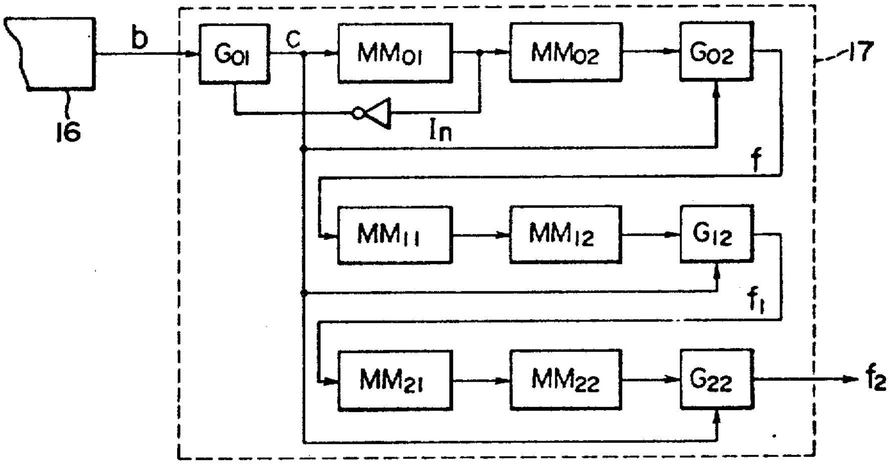
FIG. 8 is a circuit diagram of another embodiment of the confirming circuit of the apparatus of this invention.
Figure 9:
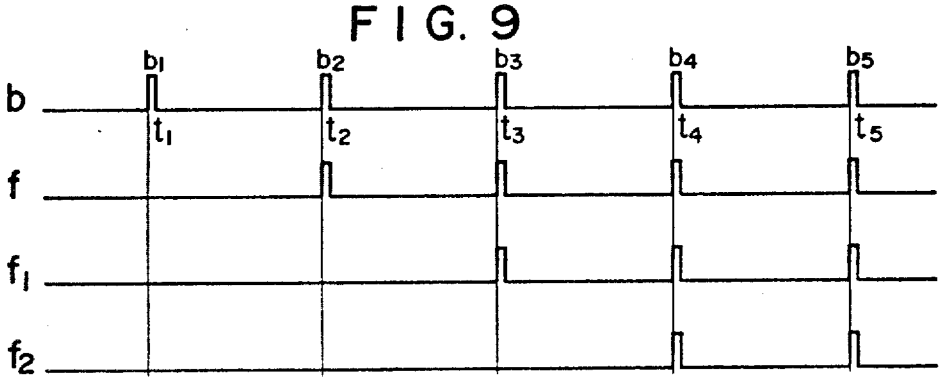
FIG. 9 is a waveform diagram for explaining the operation of the circuit of FIG. 8.

Very good confirmation of the reflected signal pulse can be obtained using the above circuit. By using plural circuits as shown in FIG. 5, more certain confirmation can be made. FIG. 8 shows a circuit formed for such purpose. FIG. 9 is a waveform diagram for explaining the circuit shown in FIG. 8. In FIG. 8, the structure and the relative connections of $G_{01}$, $MM_{01}$, $MM_{02}$, $G_{02}$ and In are the same as $G_1$, $MM_1$, $MM_2$, $G_2$ already explained with respect to FIG. 5. The structure of $MM_{11}$ and $MM_{21}$ is the same as $M_{01}$, $Mm_{12}$ and $MM_{22}$ as $MM_{02}$, and $G_{12}$ and $G_{22}$ as $G_{02}$.

The output c of the gate $G_{01}$ is connected with the next gate $G_{12}$ and further with the gate $G_{22}$. The output of the first gate $G_{02}$ is connected for setting $MM_{11}$ and the output of the next gate $G_{12}$ is connected for setting $MM_{21}$. In this confirming circuit, when a signal $b_1$ is inputted from the shaping circuit 16 at the time of $t_1$ FIG. 9, an output appears at point c, since the gate $G_{01}$ is open. The output is applied to the gates $G_{02}$, $G_{12}$ and $G_{22}$, but since at this stage these gates are closed, outputs f, $f_1$ and $f_2$ are not generated. At the time $t_2$, a signal $b_2$ is generated, and since the gate $G_{02}$ has already been opened by the outputs of $MM_{01}$ and $MM_{02}$ caused by the former pulse $b_1$, an output appears at the gate $G_{02}$. The signal $b_2$ is similarly applied to the gate $G_{12}$ and $G_{22}$, but outputs do not appear from the gates $G_{12}$ and $G_{22}$ since they are closed. When the signal $b_3$ is generated, the outputs f and $f_1$ are generated from the gates $G_{02}$ and $G_{12}$, respectively, which set $MM_{11}$ and $MM_{21}$, respectively. When a signal $b_4$ is added, since the gate $G_{22}$ is open caused by the output $f_1$, an output $f_2$ appears therefrom.

As above mentioned, in the circuit of this embodiment, the output $f_2$ is obtained only after confirming four successive correct shaped signals b. With this structure, miss-confirmation may be avoided almost completely. The output $f_1$ may be used as the output of the confirming circuit 17, or the number of groups of confirmation may be increased for still better results.

Figure 10:
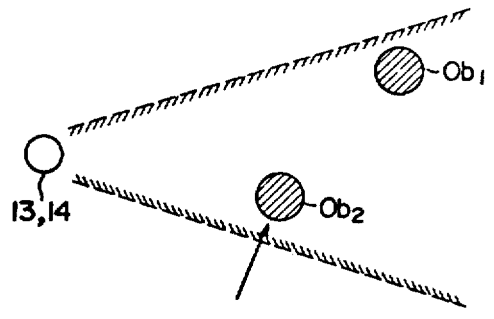
FIG. 10 is a view for explaining the situation which occurs when two reflected waves appear.
Figure 10:
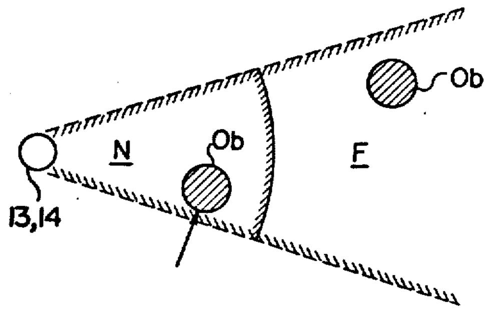
Figure 11:
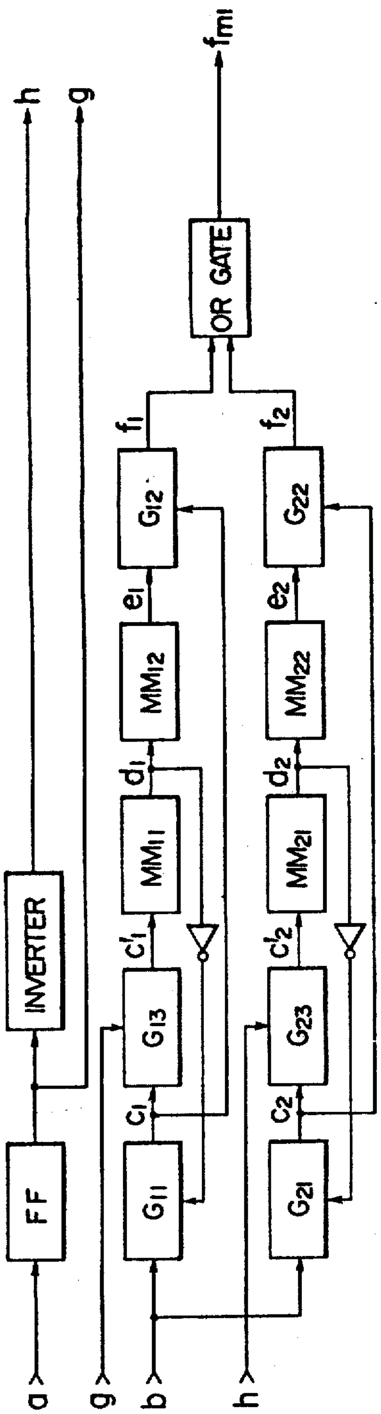
FIG. 11 is a circuit diagram of a third embodiment of the confirming circuit employing two channels.
Figure 12:
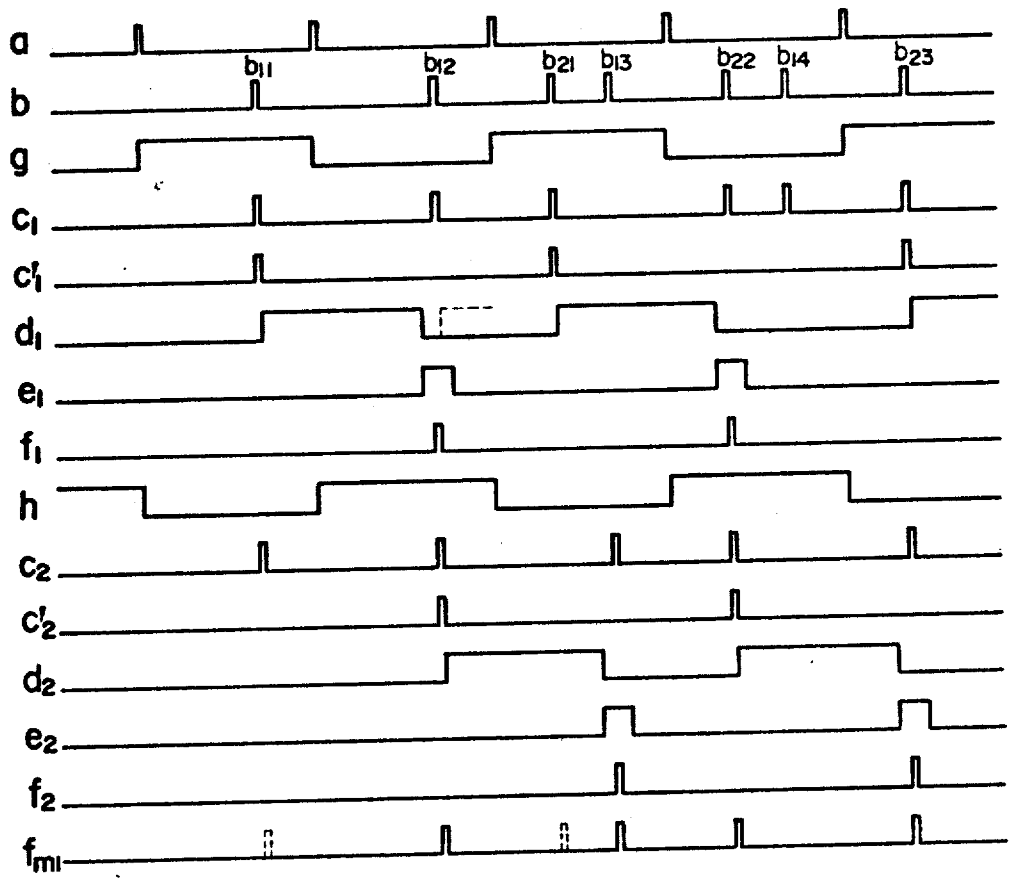
FIG. 12 is a waveform diagram for explaining the operation of the circuit shown in FIG. 11.

As already explained with reference to FIG. 7, the apparatus of this structure can confirm only one of the reflected waves from the object when more than two waves are received. In other words, in FIG. 7, the series of $b_{11}$, such as $b_{11}$, $b_{12}$, $b_{13}$ . . . , is confirmed as signals and the signals from $b_{12}$ are outputted as f, while the signals $b_{21}$ are not confirmed nor outputted. This is because the basic unit of the confirming circuit of the present invention begins its confirming operation based on the first signal. A detailed study is now made thereon with reference to FIG. 10. As is shown in (A) of FIG. 10, when an object $ob_2$ is added from the outside into the visual region of the transmitting and receiving transducers 13, 14 wherein an object $ob_1$ is already placed, the reflected waves from the object $ob_1$ may be confirmed but the waves from the object $ob_2$ can not be confirmed. This might be quite objectionable since in this case the closer object $ob_2$ cannot be confirmed. FIG. 11 shows an embodiment of the confirming circuit of the confirming apparatus for overcoming this problem. In this confirming circuit, two basic confirming circuit blocks explained before with respect to FIG. 5 are used in parallel, wherein $G_{11}$, $G_{13}$, $MM_{11}$, $MM_{12}$ and $G_{12}$ form the first channel thereof and $G_{21}$, $G_{23}$, $MM_{21}$, $Mm_{22}$ and $G_{22}$ constitute the second channel. The gates $G_{11}$ and $G_{21}$ of the respective channels corresponding to the gate $G_1$ of FIG. 5 are connected with the output terminals of the shaping circuit. $G_{12}$ and $G_{22}$ are output gates of the respective channels. The respective channels are provided with gates $G_{13}$ and $G_{23}$ which determine the operation of the respective channels, whose opening and closing are controlled by the output g of a flip-flop FF driven by a time base signal a generated from the transmitting end and also by the output h of the inverter which inverts and outputs the output h. When the designating circuit comprising flip-flop FF and the inverter designate the first channel, the gate $G_{13}$ is opened by the signal g at the output of flip-flop FF and the gate $G_{23}$ of the second channel is inhibited by the signal h at the output of the inverter. Conversely, when the designating circuit designates the second channel, the gate $G_{23}$ is opened by the output h of the inverter and the gate $G_{13}$ inhibited by the output g. The operation of the above-mentioned confirming circuit will further be explained with reference to FIG. 12. In FIG. 12 the operation of the first channel is shown by the waveforms of the upper groups of g, $c_1$, $c_1'$, $d_1$, $e_1$ and $f_1$ and the operation of the second channel is shown by the waveforms of the lower group h, $c_2$, $c_2'$, . . . $f_2$. In the first channel, the input pulse of the output g of FF at the high level is confirmed and outputted at its low level or at the next cycle. On the other hand, in the second channel the pulse of the time of H level of $\overline{g}$ or h is confirmed and outputted when h is low in level. In the confirming circuit already explained, the pulse train $b_{21}$, $b_{22}$ and $b_{23}$ cannot be confirmed, but in this circuit $b_{22}$ is confirmed by the first channel. These outputs are outputted through an OR gate.

Figure 13:
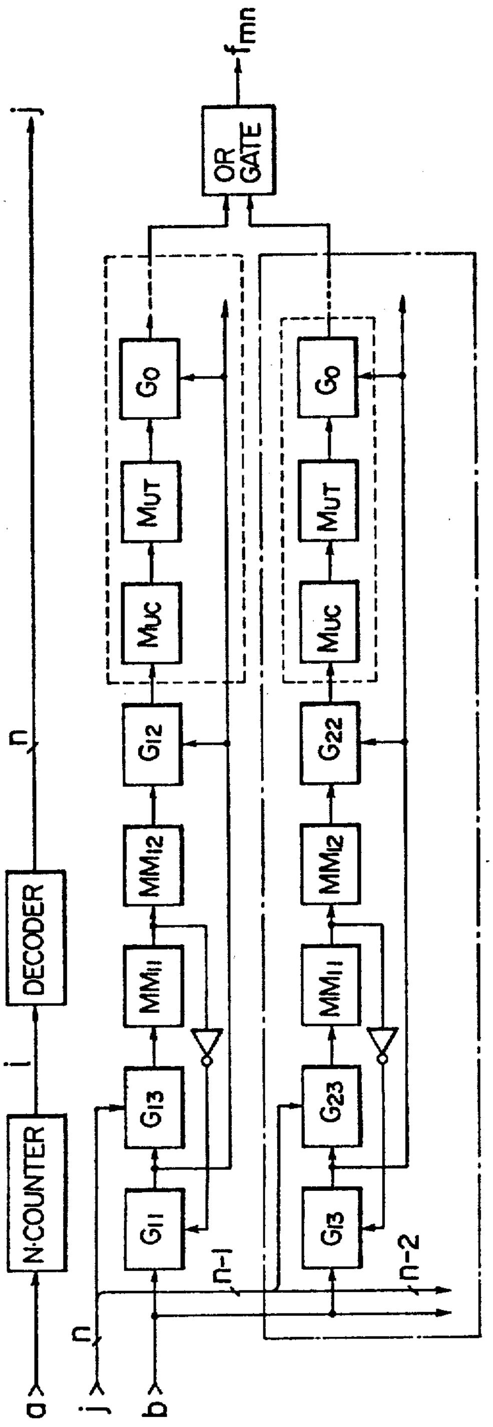
FIG. 13 is a circuit diagram showing a fourth embodiment of the confirming circuit wherein the confirming channel is made an N-channel and the number of the n parallel confirmation units are in each channel.

FIG. 13 shows an embodiment more general than the circuit of FIG. 11. Each channel connects with $n-1$ circuits encircled by dotted lines in the figure so as to form the n connections and $n-1$ circuits encircled by a chain line in the figure totalling n channels connected in parallel. With this structure, confirmation by $n+1$ samplings may be possible. With the gates $G_{13}$, $G_{23}$ . . . $G_n3$ is connected j lines consisting of $j_1$, $j_2$, . . . $j_n$ which applies opening and closing signals for the gates, which supplies each channel subsequently with an input of one low level transmitting cycle width per $n+1$ transmitting cycles. Each channel confirms the first signal newly generated in the next cycle.

With reference to FIG. 12, at the transmitting cycle wherein the flip-flop inverts again, the level of g is high high, and the signals $b_{21}$ and $b_{13}$ are generated, the channel 1 changes its object from $b_1$ to $b_2$ (in this case $b_{21}$) to initiate the operation of detection. From this it is known that when the confirming circuits follow the signal generated with new timing, it confirms the reflected wave from the closer object. This applies basically to the circuit shown in FIG. 13.

Figure 14:
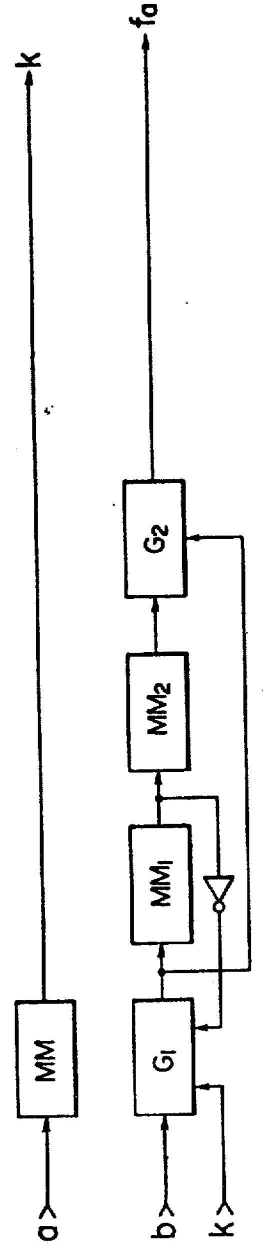
FIG. 14 is a circuit diagram showing a further confirming circuit for confirming a received signal which is generated only at the former part of one trasmitting cycle.
Figure 15:
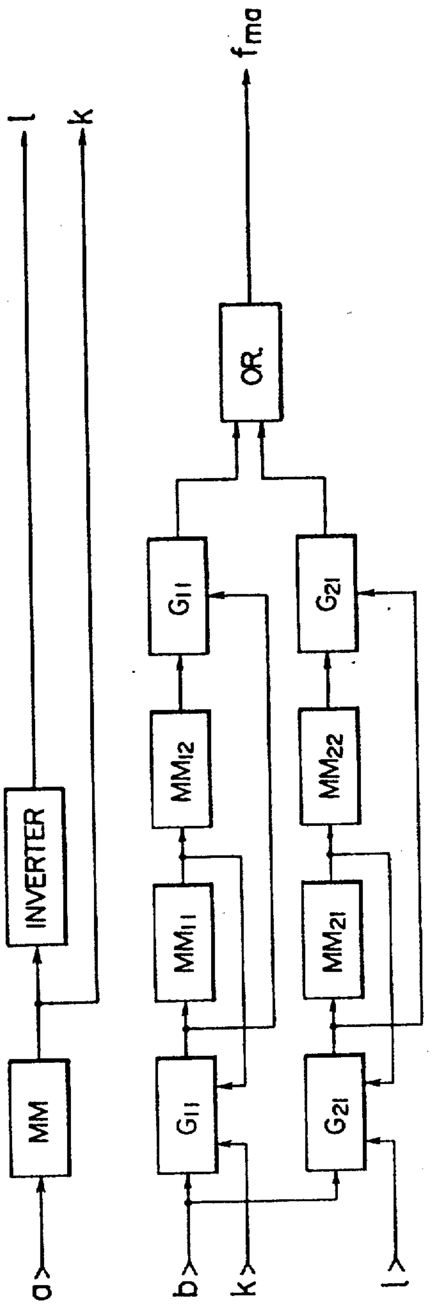
FIG. 15 is a circuit diagram of a confirming circuit wherein one transmitting cycle is divided into the former and the latter parts and confirmation of the received signal is made in each part.

FIGS. 14 and 15 show embodiments wherein the confirmation of the signal is made by the division of one transmitting cycle into parts. In FIG. 14, the gate $G_1$ of the circuit is the AND gate for three inputs and one of the input terminals is connected with the output of the monostable multivibrator MM which is triggered by the time base pulse (a) generated at the transmitter end. The delay time of multivibrator MM is made shorter than that of the transmission cycle. Therefore, the expected period setting part formed by $MM_1$, $MM_2$, etc. receives the output from the shaping circuit 16 as its input only at the former part of one transmission cycle. This means that in a case such as (B) of FIG. 10, only the reflected wave from the sector shown by N is processed, and a reflected wave from the area F is ignored. This necessity arises when only the closer object may be confirmed.

FIG. 15 is the circuit wherein the output of the multivibrator MM of the above-mentioned apparatus is connected with the inverter and there are two channels for confirmation. The gate $G_{11}$ of the first channel is supplied with the output of MM as in the case of FIG. 14, and the gate $G_{21}$ of the second channel is supplied with the output 1 of the inverter. The second channel thus functions to confirm the existence of an object in the area F shown in (B) of FIG. 10. The outputs of the gates $G_{11}$ and $G_{21}$ are connected with an OR gate, but instead thereof these outputs may be processed separately so that objects in both areas may be confirmed.

Figure 16:
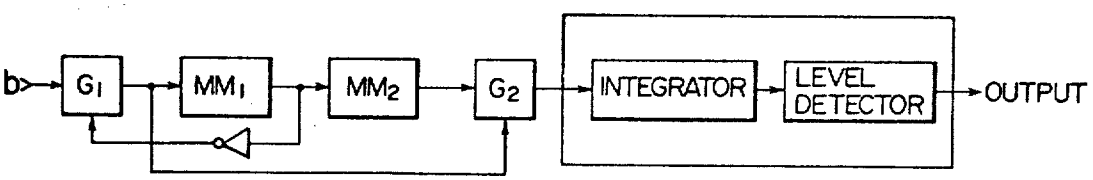
FIG. 16 is a circuit diagram showing an embodiment of an output circuit for processing and outputting the output of the confirming circuit.

FIG. 16 is an example of the output processing or output circuit of the confirming circuit. The output of the output gate $G_2$ of the confirming circuit is applied to an integrating circuit. The output of the integrating circuit is connected with a level detector and is constructed so as to transmit an output representing the fact of confirming an object when the number of the confirmed pulses exceeds a predetermined value. The charging and discharging constant of the integrating circuit may be set as desired for each purpose. If this circuit is formed to output when several pulses are subsequently inputted and to lower its level by discharging when one of the pulses is dropped, the circuit will have the same function as the circuit of FIG. 8.

While some particular embodiments of this invention have been shown and described, it will, of course, be understood that the invention is not limited thereto since many modifications thereof may be made. It is contemplated by the appended claims to cover any such modifications which fall within the true spirit and scope of this invention.

We claim:

1. An object confirming apparatus comprising:

an ultrasonic wave transmitter for transmitting ultrasonic waves at a predetermined time interval;

a receiver for receiving waves reflected by an object after the ultrasonic waves transmitted by said ultrasonic wave transmitter have impinged thereon;

a shaping circuit for shaping the output of the receiver into pulses of a predetermined width;

a first expected period setting circuit which receives an input from the shaping circuit and which sets an input expected period for a next pulse when it receives a first input pulse, and sets another expected period when it receives the next pulse within the input expected period or deems a further pulse as the first input pulse when it does not receive any input within the input expected period;

a first gate circuit whose signal input terminal is connected with the shaping circuit and whose gate control input terminal is connected with the output of the first expected period setting circuit;

a second expected period setting circuit which receives an output from the first gate circuit and which sets its input expected period when it receives its first input pulse and sets its next expected period when it receives its next input pulse within the input expected period of the second expected period setting circuit, or sets its next input pulse as the first input pulse thereof when it does not receive the next pulse within the input expected period;

a second gate circuit whose signal input terminal is connected with the shaping circuit and whose gate control input terminal is connected with the output of the second expected period setting circuit; and an output circuit which outputs an object confirming signal when more than one pulse is outputted from the second gate circuit.

2. An object confirming apparatus according to claim 1, wherein the first expected period setting circuit comprises: a first AND gate; a first monostable multivibrator connected with the output terminal of the AND gate, actuated by the fall of the output pulse of the shaping circuit which is inputted through the AND gate, and continuing until the start of the first expected period; and a second monostable multivibrator actuated by the fall of the first monostable multivibrator and continuing up to the end of the first expected period; the output of the first monostable multivibrator being returned to the gate control input terminal of the first AND gate.

3. An object confirming apparatus according to claim 1, wherein the first expected period setting circuit comprises: a first monostable multivibrator actuated by the fall of the output pulse of the shaping circuit and continuing until the start of the first expected period, the first monostable multivibrator being a non-retriggerable multivibrator, and a second monostable multivibrator actuated by the fall of the output of the first monostable multivibrator.

4. An object confirming apparatus comprising:

an ultrasonic wave transmitter for transmitting ultrasonic waves at a predetermined time interval, which includes a time base pulse generating circuit to generate time base pulses representing transmitting cycles;

a receiver for receiving waves reflected by an object after the ultrasonic waves transmitted by said ultrasonic wave transmitter have impinged thereon;

a shaping circuit for shaping the output of the receiver into pulses of a predetermined width;

a channel designating circuit for designating a confirming channel among a plurality of channels in accordance with the output of the time base pulse generating circuit and to output an inhibiting output to the other not-designated channel;

a confirming circuit provided in each channel and which includes an expected period setting circuit whose input terminal is connected with the shaping circuit output through a gate closed against the transmitting cycles designated by the output of the channel designating circuit, the expected period setting circuit setting an input expected period of a next pulse when it receives a first input pulse, and setting another expected period when it receives the next pulse within the input expected period or setting another pulse as the first pulse when it does not receive the next input pulse within the input expected period and a gate circuit whose signal input terminal is connected with the shaping circuit and whose gate control input terminal is connected with the output of the expected period setting circuit; and an output circuit to process outputs of each confirming circuit and confirm signals reflected from a plurality of object.

5. An object confirming apparatus comprising:

an ultrasonic wave transmitter for transmitting ultrasonic waves at a predetermined time interval, which includes a time base pulse generating circuit to generate time base pulses representing transmitting cycles;

a receiver for receiving waves reflected by an object after the ultrasonic waves transmitted by said ultrasonic wave transmitter have impinged thereon;

a shaping circuit for shaping the output of the receiver into pulses of a predetermined width;

a part designating circuit to generate a signal for designating a part of one transmitting cycle by the output of the time base pulse generating circuit;

an expected period setting circuit whose input terminal is connected with the shaping circuit output through a gate opened for the period designated by the output of the part designating circuit, the expected period setting circuit setting an input expected period of a next pulse when it receives a first input pulse, and setting another expected period when it receives the next pulse within the input expected period or setting another pulse as the first pulse when it does not receive the next pulse within the input expected period;

a gate circuit whose signal input terminal is connected with the shaping circuit and whose gate control input terminal is connected with the output of the expected period setting circuit; and an output circuit to process the output of the gate circuit and generates an output representing the existence of an object in the designated specified area corresponding to the designated part.

* * * * *

UNITED STATES PATENT AND TRADEMARK OFFICE

CERTIFICATE OF CORRECTION

PATENT NO. : 4,276,621

DATED : June 30th, 1981

INVENTOR(S) : Hideo Hiruma et al

It is certified that error appears in the above—identified patent and that said Letters Patent is hereby corrected as shown below: Figs. 1-5 are deleted and the following Figs. 1-16 substituted therefor:

Signed and Sealed this

*Twenty-fourth* Day of *November 1981*

[SEAL]

*Attest:*

GERALD J. MOSSINGHOFF

*Attesting Officer* — *Commissioner of Patents and Trademarks*

(A)

(B)